United States Patent Office 3,042,683
Patented July 3, 1962

3,042,683
PHTHALOCYANINE COLOURING MATTERS
Harold Thompson Howard and Christopher David Marrable, Manchester, England, assignors to Imperial Chemical Industries Limited, London, England, a corporation of Great Britain
No Drawing. Filed June 17, 1960, Ser. No. 36,730
Claims priority, application Great Britain July 2, 1959
5 Claims. (Cl. 260—314.5)

This invention relates to phthalocyanine colouring matters.

It is known to colour cellulose acetate rayon by a mass colouration process in which a suitable colouring matter is incorporated with a solution of cellulose acetate in acetone and the mixture is then spun into filaments.

The present invention relates to new colouring matters of the phthalocyanine series which are soluble in acetone and are suitable for use in the mass colouration of cellulose acetate rayon.

According to the invention we provide new colouring matters of the formula

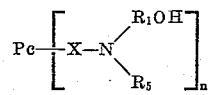

wherein Pc stands for the residue of a stable metal phthalocyanine colouring matter, —X— stands for —$CH_2$— or —$SO_2$—, $R_1$ stands for a lower alkylene radical, $R_2$ stands for a lower alkyl or an aryl radical, $R_3$ stands for hydrogen or a lower alkyl radical or for the group —$R_4.O.CO.R_2$ where $R_4$ is a lower alkylene radical, and $n$ is any number from 2 to 8.

As examples of stable metal phthalocyanine colouring matters there may be mentioned the phthalocyanines of copper, cobalt, nickel, iron, aluminum and chromium, and their derivatives in which the phthalocyanine nucleus is substituted, for example by halogen atoms such as chlorine, or aryl radicals such as phenyl and tolyl which may be attached directly to the phthalocyanine nucleus or through a linking atom or group for example a —S—, —CO— or —$SO_2NH$— group. The radical —X— in the above formula may be attached directly to the phthalocyanine nucleus or to a pendant aryl radical which itself is attached directly or through a linking atom or group to the phthalocyanine nucleus.

Those new colouring matters of the invention in which X stands for —$SO_2$— may also contain not more than one sulphonic acid group, either attached directly to the phthalocyanine nucleus or to a pendant aryl radical.

As examples of lower alkylene radicals which may be represented by $R_1$ and $R_4$ there may be mentioned ethylene, 2-ethylethylene and 2-n-propylethylene. As examples of lower alkyl or aryl radicals which may be represented by $R_2$ there may be mentioned methyl, ethyl, phenyl and chlorophenyl and as examples of lower alkyl radicals which may be represented by $R_3$ there may be mentioned methyl and ethyl As specific examples of the colouring matters of our invention there may be mentioned copper di-, tri- and tetra-[di-($\beta$-acetoxyethyl) aminomethyl]phthalocyanine, copper tri- and tetra-[di-($\beta$-acetoxyethyl)aminomethyl] tetra-(tolylmercapto)phthalocyanine, copper di-, tri-, and tetra-[di - ($\beta$ - propionyloxyethyl) aminomethyl]phthalocyanine, copper di-, tri- and tetra-[di-($\beta$-benzoyloxyethyl) aminomethyl]phthalocyanine, copper tetra-[di - ($\beta$ - acetoxyethyl) aminomethyl]tetraphenylphthalocyanine copper octa - [di - ($\beta$ - acetoxyethyl)aminomethyl]octaphenylphthalocyanine, copper tri- and tetra-($\beta$-acetoxyethylsulphamyl)phthalocyanine, copper tri- and tetra-[di-($\beta$-acetoxyethyl)sulphamyl]phthalocyanine, copper tetra - [N-ethyl-N - ($\beta$ - acetoxyethyl)sulphamyl]phthalocyanine and copper tri-[N-($\beta$-acetoxyethyl) - N - ($\beta$ - acetoxypentyl) sulphamyl]phthalocyanine, nickel and cobalt tri-($\beta$-acetoxyethylsulphamyl)phthalocyanine and copper tetra-4-chloro-tri-($\beta$-acetoxyethyl)sulphamylphthalocyanine.

According to a further feature of the invention we provide a process for the manufacture of the new colouring matters as hereinbefore defined which comprises treating a hydroxy compound of the formula

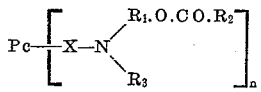

with the anhydride or chloride of a carboxylic acid of the formula $R_2COOH$ wherein Pc, X, and $R_1$ have the meanings previously stated, and $R_5$ stands for hydrogen or a lower alkyl radical or for the group —$R_6OH$ wherein $R_6$ is a lower alkylene radical.

The process of the reaction may conveniently be carried out by heating, for example to the boiling point, a suspension of the hydroxy compound in the acid anhydride until a solution is obtained. This usually requires between 1 and 4 hours. To isolate the product the solution may, for example, be diluted with about 10 times its volume of cold water and the mixture neutralised by addition of a dilute alkali such as sodium carbonate. The solid so precipitated may then be isolated by filtering, washing and drying. If desired the product may be purified by dissolving it in acetone, filtering from insoluble matter and evaporating the acetone solution to dryness.

Hydroxy compounds suitable for use in the process of the invention may be obtained by reaction of a chloro compound of the formula Pc—X—Cl wherein Pc and X have the meanings already stated with the appropriate hydroxyamino compound. Thus the hydroxy compounds in which —X— stands for —$CH_2$— may be obtained from chloromethyl phthalocyanines and the hydroxy compounds in which —X— stands for —$SO_2$— may be obtained from phthalocyanine sulphonyl chlorides. Reaction of a chloro compound of the above formula wherein X stands for —$SO_2$— with a hydroxyamino compound may result in the formation of a product which contains sulphonic acid groups in addition to substituted sulphonamide groups. Such products are nevertheless suitable for use in the process of the invention, provided that they do not contain more than one sulphonic acid group.

According to a further feature of the invention we provide an alternative process for the manufacture of the new colouring matters as hereinbefore defined which comprises treating a halogeno compound of the formula Pc[X—halogen]$_n$ with an amine of the formula

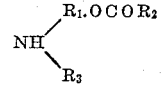

wherein Pc, X, n, $R_1$, $R_2$ and $R_3$ have the meanings previously stated.

As examples of halogeno compounds which may be used in the alternative process of the invention there may be mentioned copper di- and tetra-chloromethyl phthalocyanine and copper phthalocyanine di- and tri-sulphonchloride. As examples of amines which may be used in the alternative process of the invention there may be mentioned $\beta$-acetoxyethylamine and di($\beta$-acetoxyethyl)amine.

The new colouring matters of the invention are suitable for use in the colouration of plastics and lacquers, and being readily and completely soluble in acetone they are especially suitable for use in the mass colouration of cellulose acetate rayon, giving blue to green shades of high fastness to light and to wet treatments.

The new colouring matters in which Pc stands for copper phthalocyanine form a preferred feature of the invention because when used in the mass colouration of cellulose acetate rayon they give bright shades of excellent fastness to light and wet treatments.

Copper tri- and tetra-(β-acetoxyethylsulphamyl)phthalocyanine and copper tri- and tetra-[di-(β-acetoxyethyl)sulphamyl]phthalocyanine are of especial value in the mass colouration of cellulose acetate rayon because they give bright turquoise blue shades of outstanding fastness to light and to wet treatments.

The invention is illustrated but not limited by the following examples in which the parts are by weight.

*Example 1*

5 parts of a mixture of copper di- and tri-[di-(β-hydroxyethyl)aminomethyl]phthalocyanine is stirred with 25 parts of acetic anhydride and boiled under reflux for 1 hour. The mixture is cooled and diluted with 200 parts of cold water, made just alkaline to Brilliant Yellow paper by the addition of 10% aqueous sodium carbonate solution. The product is filtered off and dried.

The dry solid is dissolved in acetone and the solution filtered from insoluble material. By evaporation of the acetone a mixture of copper di- and tri-[di-(β-acetoxyethyl)aminomethyl]phthalocyanine is obtained. The product is suitable for use in the mass colouration of cellulose acetate rayon and gives bright greenish blue shades of high fastness to light and wet treatments.

The mixture of copper di- and tri-[di(β-hydroxyethyl)-aminomethyl]phthalocyanine used in this example may be obtained as described in Example 5 of British application No. 11,399/58.

*Example 2*

5 parts of a mixture of copper tri- and tetra-[di-(β-hydroxyethyl)aminomethyl] - tetra-(tolylmercapto)phthalocyanine is stirred with 25 parts of acetic anhydride and boiled under reflux for 1 hour. The mixture is cooled and diluted with 200 parts of water, made just alkaline to Brilliant Yellow paper with 10% aqueous sodium carbonate solution. The product is filtered off, washed with water and dried. The mixture of copper tri- and tetra-[di(β-acetoxyethyl)aminomethyl]tetra-(tolylmercapto)phthalocyanine so obtained is completely soluble in acetone and is suitable for use in the mass colouration of cellulose acetate rayon giving bright green shades of high fastness to light and wet treatments.

The mixture of copper tri- and tetra[di-(β-hydroxyethyl)aminomethyl] - tetra - (tolylmercapto)phthalocyanine used in this example may be obtained as described in Example 9 of British application No. 11,399/58.

*Example 3*

In place of the 25 parts of acetic anhydride used in Example 2 there is used 25 parts of propionic anhydride. The mixture of copper tri- and tetra-[di-(β-propionyloxyethyl)aminomethyl]tetra - (tolylmercapto)phthalocyanine so obtained is completely soluble in acetone and is suitable for use in the mass colouration of cellulose acetone rayon, giving fast green shades.

*Example 4*

In place of the 25 parts of acetic anhydride used in Example 2, there is used 25 parts of benzoic anhydride and the mixture is stirred at 140° C. for 1 hour. The mixture of copper tri- and tetra-[di(β-benzyloxyethyl)aminomethyl]tetra - (tolylmercapto)phthalocyanine so obtained is soluble in acetone and may be used in the mass colouration of cellulose acetate rayon, giving fast green shades.

*Example 5*

In place of the 5 parts of the mixture of copper tri- and tetra - [di - (β - hydroxyethyl)aminomethyl]tetra - (tolylmercapto) - phthalocyanine used in Example 2 there is used 5 parts of copper tetra-[di-(β-hydroxyethyl)aminomethyl]-tetraphenyl phthalocyanine. The copper tetra-[di(β - acetoxyethyl) - aminomethyl]tetraphenylphthalocyanine so obtained is soluble in acetone and gives fast green shades when used in the mass colouration of cellulose acetate rayon.

Copper tetra - [di - (β - hydroxyethyl)aminomethyl]-tetra - phenylphthalocyanine may be obtained by reacting copper tetra(chloromethyl)tetraphenylphthalocyanine obtained as described in Example 13 of British patent specification No. 586,340) with di-(β-hydroxyethyl)amine.

*Example 6*

In place of the 5 parts of the mixture of copper tri- and tetra - [di - (β - hydroxyethyl)aminomethyl]tetra(tolylmercapto)-phthalocyanine used in Example 2, there is used 5 parts of copper octa-[di-(β-hydroxyethyl)aminomethyl]octaphenylphthalocyanine. The copper octa[di-(β - acetoxyethyl)aminomethyl] - octaphenylphthalocyanine so obtained is soluble in acetone and gives fast green shades when used in the mass colouration of cellulose acetate rayon.

Copper octa - [di - (β - hydroxyethyl)aminomethyl]-octaphenylphthalocyanine may be obtained as described in Example 22 of British application No. 11,399/58.

*Example 7*

10 parts of copper tri-(β-hydroxyethylsulphamyl) phthalocyanine is stirred with 50 parts of acetic anhydride and the mixture is boiled under reflux for 4 hours. After cooling the mixture is poured into 500 parts of water and 10% aqueous sodium carbonate solution is added with stirring until the suspension is just alkaline to Brilliant Yellow paper. The solid product is filtered off, washed with water and dried. It is then purified by extraction with acetone and evaporation of the acetone solution. The copper tri(β-acetoxyethylsulphamyl)phthalocyanine so obtained is readily soluble in acetone and may be used in the mass colouration of cellulose acetate rayon giving bright greenish blue shades of outstanding fastness to light and wet treatments.

The copper tri(β-hydroxyethylsulphamyl)phthalocyanine used in this example may be obtained as follows:

12.5 parts of copper phthalocyanine is added to 40 parts of chlorosulphonic acid and stirred until dissolved, then heated to 120° C. for 2½ hours. After this time the solution is cooled to 80° C. and 5 parts of thionyl chloride is added during 15 minutes. The mixture is then heated at 95° C. for a further 2 hours. The solution is cooled and poured into a mixture of ice and water, adding ice as required to keep the temperature below 0° C. The precipitated copper phthalocyanine trisulphonyl chloride is filtered off and the filter cake is suspended in 100 parts of water at 0° C. 10% aqueous sodium bicarbonate solution is added until the mixture is no longer acid to Congo Red paper, the temperature being kept at 0° C. by addition of ice to the mixture when necessary. 35 parts of β-hydroxyethylamine is then added and the mixture is stirred for 16 hours at atmospheric temperature and then for 1 hour at 60° C. The insoluble copper tri(β-hydroxyethylsulphamyl)phthalocyanine is filtered off, washed and dried.

*Example 8*

In place of the 10 parts of copper tri-(β-hydroxyethylsulphamyl)phthalocyanine used in Example 7 there is used 10 parts of copper tetra-(β-hydroxyethylsulphamyl) phthalocyanine. The copper tetra-(β-acetoxyethylsulphamyl)phthalocyanine so obtained is soluble in acetone and may be used in the mass colouration of cellulose acetate, giving bright greenish blue shades of outstanding fastness to light and to wet treatments.

Copper tetra - (β - hydroxyethylsulphamyl)phthalocyanine may be obtained by a procedure exactly similar to that described in Example 7 for the corresponding tri-(β-hydroxyethylsulphamyl) compound, except that the solution of copper phthalocyanine in chlorosulphonic acid is heated to 140° C. for 2 hours instead of 120° C. for 2½ hours.

*Example 9*

In place of the 10 parts of copper tri-(β-hydroxyethylsulphamyl)phthalocyanine used in Example 7 there is used 10 parts of copper tri-[di-(β-hydroxyethyl)sulphamyl]phthalocyanine. The copper tri-[di-(β-acetoxyethyl)sulphamyl]phthalocyanine so obtained is readily soluble in acetone and may be used in the mass colouration of cellulose acetate rayon, giving bright greenish blue shades of outstanding fastness.

Copper tri-[di-(β-hydroxyethyl)sulphamyl]phthalocyanine may be obtained by a procedure exactly similar to that described in Example 7 for the corresponding tri-(β-hydroxyethylsulphamyl) compound except that di-(β-hydroxyethyl)amine is used in place of β-hydroxyethylamine.

*Example 10*

In place of the 10 parts of copper tri-(β-hydroxyethylsulphamyl)phthalocyanine used in Example 7 there is used 10 parts of copper tetra-[di-(β-hydroxyethyl)sulphamyl]phthalocyanine. The copper tetra-[di-(β-acetoxyethyl)sulphamyl]phthalocyanine so obtained is soluble in acetone and may be used in the mass colouration of cellulose acetate, giving bright greenish blue shades of outstanding fastness to light and to wet treatments.

Copper tetra-[di-(β-hydroxyethyl)sulphamyl]phthalocyanine may be obtained by a procedure similar to that described in Example 8 for the corresponding tetra-(β-hydroxyethylsulphamyl) compound, except that di-(β-hydroxyethyl)amine is used in place of β-hydroxyethylamine.

*Example 11*

Using procedures closely similar to those given in Examples 7, 8, 9 and 10 copper phthalocyanine tri- or tetra-sulphonyl chloride may be reacted with N-methyl ethanolamine, N-ethyl ethanolamine, 2 - methyl - 2 - hydroxy-n-pentylamine, N-(2-hydroxyethyl) - N - (2'-hydroxybutyl) amine or N:N-di(2-hydroxy-n-propyl)amine to give hydroxyalkylsulphamyl compounds which may then be acetylated by boiling with acetic anhydride. The products are all soluble in acetone and are suitable for use in the mass colouration of cellulose acetate rayon, giving bright greenish blue shades which have excellent fastness to light and to wet treatments.

*Example 12*

12 parts of a mixture of nickel tri- and tetra-(β-hydroxyethylsulphamyl)phthalocyanine is stirred with 60 parts of acetic anhydride and boiled under reflux for 4 hours. The mixture is cooled and diluted with 500 parts of cold water, and made just alkaline to Brilliant Yellow paper by the addition of aqueous sodium hydroxide solution. The product is filtered off and dried.

The dry solid is dissolved in acetone and the solution filtered from insoluble material. By evaporation of the acetone solution a mixture of nickel tri- and tetra-(β-acetoxyethylsulphamyl)phthalocyanine is obtained. The product is suitable for use in the mass colouration of cellulose acetate rayon and gives blue shades of high fastness to light and wet treatments.

The mixture of nickel tri- and tetra-(β-hydroxyethylsulphamyl)phthalocyanine used in this example may be obtained by using nickel phthalocyanine in place of copper phthalocyanine in the procedure described in Example 7 for obtaining copper tri(β-hydroxyethylsulphamyl)phthalocyanine.

*Example 13*

In place of the 12 parts of nickel tri- and tetra-(β-hydroxyethylsulphamyl)phthalocyanine used in Example 12, there is used 12 parts of nickel tri- and tetra-[di(β-hydroxyethyl)sulphamyl]phthalocyanine. The nickel tri- and tetra-[di(β-acetoxyethyl)sulphamyl]phthalocyanine so obtained is soluble in acetone and may be used in the mass colouration of cellulose acetate rayon, giving blue shades of good fastness.

The nickel tri- and tetra-[di(β-hydroxyethyl)sulphamyl] phthalocyanine may be obtained by a procedure exactly similar to that described in Example 7 for copper tri-[β-hydroxyethylsulphamyl]phthalocyanine except that nickel phthalocyanine is used in place of copper phthalocyanine and di-(β-hydroxyethyl) amine is used in place of β-hydroxyethylamine.

*Example 14*

10 parts of cobalt tri(β-hydroxyethylsulphamyl)-phthalocyanine is stirred with 50 parts of acetic anhydride and boiled under reflux for four hours. The mixture is cooled and diluted with 500 parts of cold water and neutralized by the addition of aqueous caustic soda solution. The product is filtered off and dried. The dry solid is dissolved in acetone and the solution is filtered from insoluble material. By evaporation of the acetone solution cobalt tri-(β-acetoxyethylsulphamyl)phthalocyanine is obtained. The product is suitable for use in the mass colouration of cellulose acetate rayon, and gives blue shades of high fastness.

Cobalt tri-(β-hydroxyethylsulphamyl)phthalocyanine may be obtained by a procedure exactly similar to that used in Example 7 for copper tri(β-hydroxyethylsulphamyl)phthalocyanine, except that cobalt phthalocyanine is used in place of copper phthalocyanine.

*Example 15*

In place of the 10 parts of cobalt tri(β-hydroxyethylsulphamyl)pthalocyanine used in Example 14, there is used 10 parts of cobalt tri-[di-(β-hydroxyethyl)sulphamyl]phthalocyanine. The cobalt tri-[di-(β-acetoxyethyl)sulphamyl]phthalocyanine so obtained is soluble in acetone and may be used in the mass colouration of cellulose acetate rayon, giving blue shades of good fastness.

Cobalt tri-[di(β-hydroxyethyl)sulphamyl]phthalocyanine may be obtained by a procedure exactly similar to that described in Example 7 for copper tri(β-hydroxyethylsulphamyl)phthalocyanine except cobalt phthalocyanine is used in place of copper phthalocyanine and di-(β-hydroxyethyl)amine is used in place of β-hydroxyethylamine.

*Example 16*

10 parts of copper tetra-4-chloro tri(β-hydroxyethylsulphamyl)phthalocyanine is stirred with 50 parts of acetic anhydride and boiled under reflux for 4 hours. The mixture is cooled and diluted with 500 parts of cold water, and neutralised by the addition of aqueous sodium hydroxide solution. The product is filtered off and dried. The dry solid is dissolved in acetone, and the solution is filtered from insoluble material. By evaporation of the acetone solution copper tetra-4-chloro tri(β-acetoxyethyl)-sulphamyl phthalocyanine is obtained. The product is suitable for use in the mass colouration of cellulose acetate rayon and gives greenish-blue shades of high fastness.

Copper tetra-4-chloro tri-(β-hydroxyethylsulphamyl)-phthalocyanine may be obtained by reacting copper tetra-4-chlorophthalocyanine tri-sulphonchloride with β-hydroxy-ethylamine. Copper tetrachlorophthalocyanine tri-sulphonchloride may be obtained by heating a mixture of 36 parts copper tetra-4-chlorophthalocyanine with 100 parts chlorosulphonic acid at 120° C. for 3 hours, cooling to 80° C. and adding 15 parts of thionylchloride, then heating at 95° C. for 2 hours. The solution is cooled and poured into ice and water, adding ice as required to keep the temperature below 0° C., and the precipitated copper tetrachlorophthalocyanine trisulphonchloride is filtered off.

*Example 17*

In place of the 10 parts of copper tetra-4-chloro tri(β-hydroxyethylsulphamyl)phthalocyanine used in Example 16, there is used 10 parts of copper tetra-4-chloro-tri-(di-(β-hydroxyethyl)sulphamyl)phthalocyanine. The copper tetra-4-chloro tri(di(β-acetoxyethyl)sulphamyl)phthalocyanine so obtained is soluble in acetone and may be used in the mass colouration of cellulose acetate rayon, giving greenish blue shades of good fastness.

Copper tetra-4-chloro tri-(di(β-hydroxyethyl)sulphamyl)phthalocyanine may be obtained by a procedure exactly similar to that described in Example 16 for copper tetrachloro tri(β-hydroxyethylsulphamyl)phthalocyanine except that di(β-hydroxyethyl)amine is used in place of β-hydroxyethylamine.

Example 18

10 parts of copper tri-(β-hydroxyethylsulphamyl)-phthalocyanine and 20 parts of acetylchloride is stirred for 4 hours at 100° C. The mixture is cooled, diluted with 400 parts of water and stirred to decompose excess acetyl chloride. The product is filtered off, washed, and dried. The copper tri(β-acetoxyethylsulphamyl)phthalocyanine obtained may be separated from some insoluble matter by dissolving in acetone, filtering off and evaporating to dryness. The properties of the product are identical with those of the product of Example 7.

Example 19

In place of the 20 parts of acetylchloride used in Example 18, there is used 30 parts of benzoylchloride. The copper tri-(β-benzoyloxyethylsulphamyl)phthalocyanine so obtained is soluble in acetone and may be used in the mass colouration of cellulose acetate rayon, giving blue shades of good fastness.

Example 20

10 parts of a mixture of copper di- and tri-[di(β-hydroxyethyl)-aminomethyl]phthalocyanine is stirred with 50 parts of acetylchloride and boiled under reflux for 4 hours. The mixture is cooled and diluted with 500 parts of cold water, and neutralised by the addition of aqueous sodium carbonate solution. The product is filtered off and dried.

The dry solid is dissolved in acetone and the solution filtered from insoluble material. By evaporation of the acetone a mixture of copper di- and tri-[di(β-acetoxyethyl)aminomethyl]phthalocyanine is obtained. The properties of the product are identical wtih those of the product of Example 1.

Example 21

10 parts of copper phthalocyanine trisulphonchloride and 100 parts of water is stirred at 0° C. and 20 parts of β-acetoxyethylamine hydrochloride added, followed by 15 parts of soda ash. The mixture is stirred at room temperature for 4 hours then at 50° C. for 1 hour. The cooled mixture is filtered, and the product is filtered off and dried. The dry solid is dissolved in acetone and the solution is filtered from insoluble material. By evaporation of the acetone solution copper tri-(β-acetoxyethylsulphamyl)phthalocyanine is obtained, identical in properties with the product of Example 7.

Example 22

In place of the 20 parts of β-acetoxyethylamine hydrochloride used in Example 21, there is used 32 parts of di(β-acetoxyethyl)amine hydrochloride. Copper tri-(di-(β-acetoxyethyl)sulphamyl)phthalocyanine is obtained, identical in properties with the product of Example 9.

Example 23

In place of the 10 parts of copper tri(β-hydroxyethylsulphamyl)phthalocyanine used in Example 7 there is used 10 parts of copper monosulpho-tri-[di-(β-hydroxyethyl)sulphamyl]phthalocyanine. The copper monosulpho-tri-[di-(β-acetoxyethyl)sulphamyl]phthalocyanine salt obtained is soluble in acetone and is suitable for use in the mass colouration of cellulose acetate.

Copper monosulpho - tri - [di - (β - hydroxyethyl)sulphamyl]phthalocyanine may be obtained by a procedure similar to the described in Example 7 for copper tri-(β-hydroxyethylsulphamyl)phthalocyanine except that the solution of copper phthalocyanine in chlorosulphonic acid is heated to 140° C. for 2 hours instead of 120° C. for 2½ hours, and that 17 parts of di(β-hydroxyethyl)amine is used in place of 35 parts of β-hydroxyethylamine.

What we claim is:
1. A compound of the formula

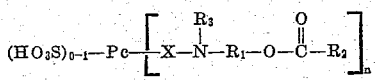

wherein Pc represents a metal phthalocyanine radical and selected from the class consisting of the unsubstituted metal phthalocyanine, chlorosubstituted phthalocyanine, monocylic aryl-substituted phthalocyanine, monocylic arylthio-substituted phthalocyanine, monocyclic arylcarbonyl-substituted phthalocyanine and monocyclic aryl sulphamyl-substituted phthalocyanine;

the metal is selected from the group consisting of copper cobalt, nickel, iron, aluminum and chromium;

X represents a divalent radical, selected from the class consisting of $-CH_2-$ and $-SO_2-$;

$R_1$ represents lower alkylene;

$R_2$ represents a monovalent radical, selected from the class consisting of lower alkyl, phenyl and chlorophenyl;

$R_3$ represents a monovalent radical, selected from the class consisting of hydrogen, lower alkyl and the grouping

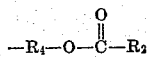

wherein $R_4$ is lower alkylene; and $n$ is an integer from 2 to 8.

2. Copper tetra-(β-acetoxyethylsulphamyl)phthalocyanine.

3. Copper tetra-[di-(β-acetoxyethyl)sulphamyl]phthalocyanine.

4. Copper tri-(β-acetoxyethylsulphamyl)phthalocyanine.

5. Copper tri-[di-(β-acetoxyethyl)sulphamyl]phthalocyanine.

References Cited in the file of this patent

UNITED STATES PATENTS 2,547,972    Randall et al.    Apr. 10, 1951

OTHER REFERENCES

Wagner et al.: Synthetic Organic Chemistry, Wiley, New York, N.Y. (1953), pages 481 and 482.